United States Patent
Bosch et al.

(10) Patent No.: US 8,050,259 B2
(45) Date of Patent: Nov. 1, 2011

(54) METHOD AND APPARATUS OF PRECEDENCE IDENTIFICATION FOR REAL TIME SERVICES

(75) Inventors: Peter Bosch, New Providence, NJ (US); Louis Samuel, Swindon (GB)

(73) Assignee: Alcatel Lucent, Paris (FR)

( * ) Notice: Subject to any disclaimer, the term of this patent is extended or adjusted under 35 U.S.C. 154(b) by 1210 days.

(21) Appl. No.: 11/474,197

(22) Filed: Jun. 23, 2006

(65) Prior Publication Data

US 2007/0297401 A1 Dec. 27, 2007

(51) Int. Cl.
*H04L 12/56* (2006.01)

(52) U.S. Cl. ......... 370/389; 370/392; 370/401; 709/245

(58) Field of Classification Search .................. 370/389, 370/392, 400, 401, 471; 709/238, 240, 245
See application file for complete search history.

(56) References Cited

U.S. PATENT DOCUMENTS

| | | | | |
|---|---|---|---|---|
| 4,769,815 | A * | 9/1988 | Hinch et al. | 370/236 |
| 6,731,625 | B1 | 5/2004 | Eastep et al. | |
| 6,934,249 | B1 * | 8/2005 | Bertin et al. | 370/218 |
| 6,975,629 | B2 * | 12/2005 | Welin | 370/392 |
| 6,977,905 | B1 * | 12/2005 | Shaffer et al. | 370/252 |
| 6,999,447 | B2 * | 2/2006 | D'Amico et al. | 370/349 |
| 7,023,971 | B1 | 4/2006 | Huart et al. | |
| 2002/0064149 | A1 | 5/2002 | Elliott et al. | |
| 2005/0047396 | A1 * | 3/2005 | Helm et al. | 370/352 |
| 2006/0251130 | A1 * | 11/2006 | Greer et al. | 370/508 |
| 2006/0274791 | A1 * | 12/2006 | Garcia et al. | 370/508 |
| 2007/0002740 | A1 * | 1/2007 | Evans et al. | 370/230.1 |

FOREIGN PATENT DOCUMENTS

WO WO 2005/096566 10/2005

OTHER PUBLICATIONS

PCT International Search Report corresponding to PCT Patent Application PCT/US2007/014420 filed Jun. 19, 2007 (3 pages).
PCT Written Opinion of the International Searching Authority corresponding to PCT Patent Application PCT/US2007/014420 filed Jun. 19, 2007 (6 pages).

* cited by examiner

*Primary Examiner* — Hassan Phillips
*Assistant Examiner* — Duc Duong
(74) *Attorney, Agent, or Firm* — Harness, Dickey & Pierce, P.L.C.

(57) ABSTRACT

Disclosed is a system and method for transmitting a data packet from a source to a destination via a network path having a number of hops. The sum of a playback delay associated with the data packet and the number of hops are stored in a header of the data packet. The data packet is transmitted from the source to the destination via the network path.

20 Claims, 7 Drawing Sheets

METHOD AND APPARATUS OF PRECEDENCE IDENTIFICATION FOR REAL TIME SERVICES

BACKGROUND OF THE INVENTION

The present invention relates generally to quality of service in Internet Protocol (IP) networks, and more specifically to prioritizing data packets in an IP network.

Quality of service (QoS) in Internet Protocol (IP) networks is the throughput guarantee provided by an IP network to different data streams that are transported over the IP network (i.e., a guaranteed throughput level).

Network components, such as routers, often rely on indication mechanisms in an IP header of a packet to route the packet correctly. Several IP packet standards, or versions, exist. For example, packets can follow the standards defined by Internet Protocol version 4 (IPv4) (i.e., IPv4 packets) or Internet Protocol version 6 (IPv6) (i.e., IPv6 packets).

FIG. 1 is a block diagram of an IPv4 packet header 100 including a Type of Service (TOS) field 104. The TOS field 104 is for Internet service quality selection. The type of service is specified via parameters such as Precedence, Delay, Throughput, and Reliability. The IPv4 header 100 also includes a Time-To-Live (TTL) field 108. The TTL field 108 contains a value that indicates to a network router or switch whether or not the packet has been in the network too long and is to be discarded. For a number of reasons, packets may not get delivered to their destination in a reasonable length of time. For example, incorrect routing tables may cause a packet to loop between two routers endlessly. A solution is to discard the packet after a certain time. The initial TTL value 108 is set in an 8 bit field of the packet header. Since each router is required to subtract at least one count from the TTL field, the count is usually used to indicate the number of router hops the packet is allowed before it must be discarded.

FIG. 2 is a block diagram of an IPv6 header 200 including a Traffic Class (TC) field 204. The IPv6 header 200 also includes a Hop Limit field 208. The Hop Limit field 208 indicates the maximum number of hops that the packet can travel before being discarded. The Hop Limit field 208 is similar to the TTL value in an IPv4 packet.

FIG. 3(a) provides more detail of the IPv4 TOS field 104. The TOS field 104 includes a Precedence field 304 and a Priority field 306. The Precedence field 304 is a field used to prioritize an IPv4 packet. The Precedence field 304 designates whether the network determines, using the Priority field 306, the priority of a packet or whether the Priority field 306 is ignored and the network does not determine the priority of a packet. The Priority field 306 allows the network to take of advantage of various queuing and congestion control mechanisms that may exist within the network.

FIG. 3(b) provides more detail of the IPv6 TC field 204. The TC field 204 is available for use by originating routers and/or forwarding routers to identify and distinguish between different classes or priorities of IPv6 packets. The TC field 204 is used to provide various forms of "differentiated service" for IPv6 packets. Differentiated Service Code Points (DSCP), or DiffServe, is a marker in the header of each IP packet that prompts network routers to apply differentiated grades of service to various packet streams, forwarding them according to different Per-Hop Behaviors (PHBs). This enables Internet and other IP-based network service providers to offer differentiated levels of service to customers and their information streams. DiffServ has also been implemented in the TOS field of an IPv4 packet.

When a packet enters an IP router, its IP header is inspected. The inspection determines a next hop and a priority with which the packet is forwarded from the current router. The priority is determined by interpreting the Precedence field 304 and Priority field 306 for the TOS field 104 of an IPv4 packet and the Differentiated Service Code Points (DSCP) value in the TC field 204 of an IPv6 packet. If a packet's header fields do not provide enough guidance to determine its priority, a deep packet inspection is performed to gain more information from which a priority decision can be made.

A packet's priority affects when the packet is scheduled to be transmitted to its next hop. In wired networks, the task of packet scheduling is to associate a packet with a time slot (at a constant power, data rate, and through one shared channel). In wireless networks, packet scheduling can be more general than that—its function is to schedule such resources as time slots, powers, data rates, channels, or a combination of them, when packets are transmitted. Specifically, based on a source's characteristics, QoS requirements, channel states, and/or queue lengths, a wireless scheduler assigns time slots, powers, data rates, and/or channels to the packets for transmission.

Real-time Transport Protocol (RTP) is an Internet protocol for transmitting real-time data such as audio and video. RTP supports streaming data. To schedule an RTP voice stream over a wireless channel, the time that the packet is due at a destination router (i.e., the packet's deadline) needs to be known by the router sending the voice stream. Packets of an RTP voice stream, however, may be encrypted. If the voice stream is encrypted, then the deadline cannot be retrieved from the packet. Specifically, if a packet is encrypted, then any method that involves packet inspection will typically not be effective because no additional knowledge of the importance of the packet data can be obtained due to the encryption.

Wireless links are typically either the first or last link in the network. The majority of QoS is often determined by behavior of the last wireless hop node (e.g., router). The last wireless hop node will not typically be able to use a packet's header alone to determine the relative importance of a packet among packets of the same service ensemble (e.g., packets associated with a single Voice over Internet Protocol (VoIP) telephone call).

Therefore, there remains a need for an improved way of identifying the priority of a packet at the last hop node.

BRIEF SUMMARY OF THE INVENTION

The present invention is a method and apparatus for transmitting a data packet from a source to a destination via a network path having a number of hops. The sum of a playback delay associated with the data packet and the number of hops are stored in a header of the data packet. The data packet is transmitted from the source to the destination via the network path.

In one embodiment, the sum of the playback delay and the number of hops is calculated at the source. Alternatively, the sum may be calculated at the destination.

In one embodiment, the data packet is processed (e.g., played by a wireless telephone) during a VoIP telephone call before the sum of the playback delay and the number of hops expires. The sum of the playback delay and the number of hops may be stored in the TTL field of the header of the packet. The number of hops can be determined by, for instance, the source pinging the destination. The priority of the data packet can be determined from the playback delay and the number of hops.

These and other advantages of the invention will be apparent to those of ordinary skill in the art by reference to the following detailed description and the accompanying drawings.

DETAILED DESCRIPTION

Figure 1:
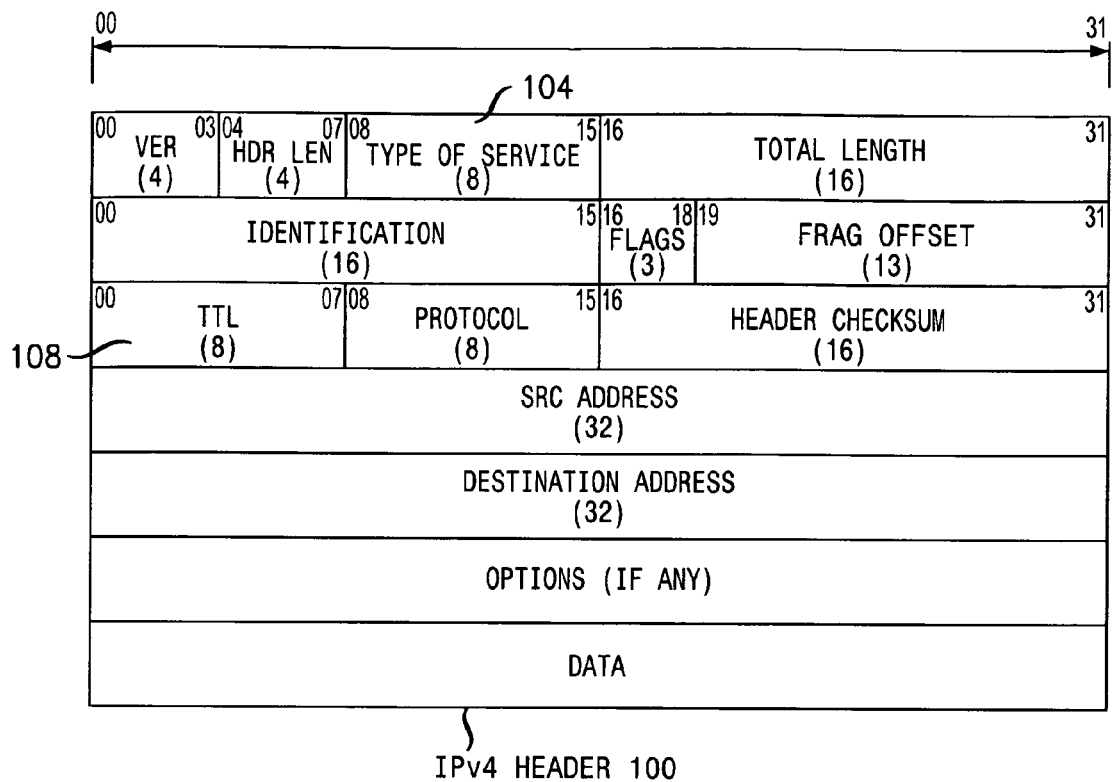
FIG. 1 is a block diagram of a prior art IPv4 packet header.
Figure 2:
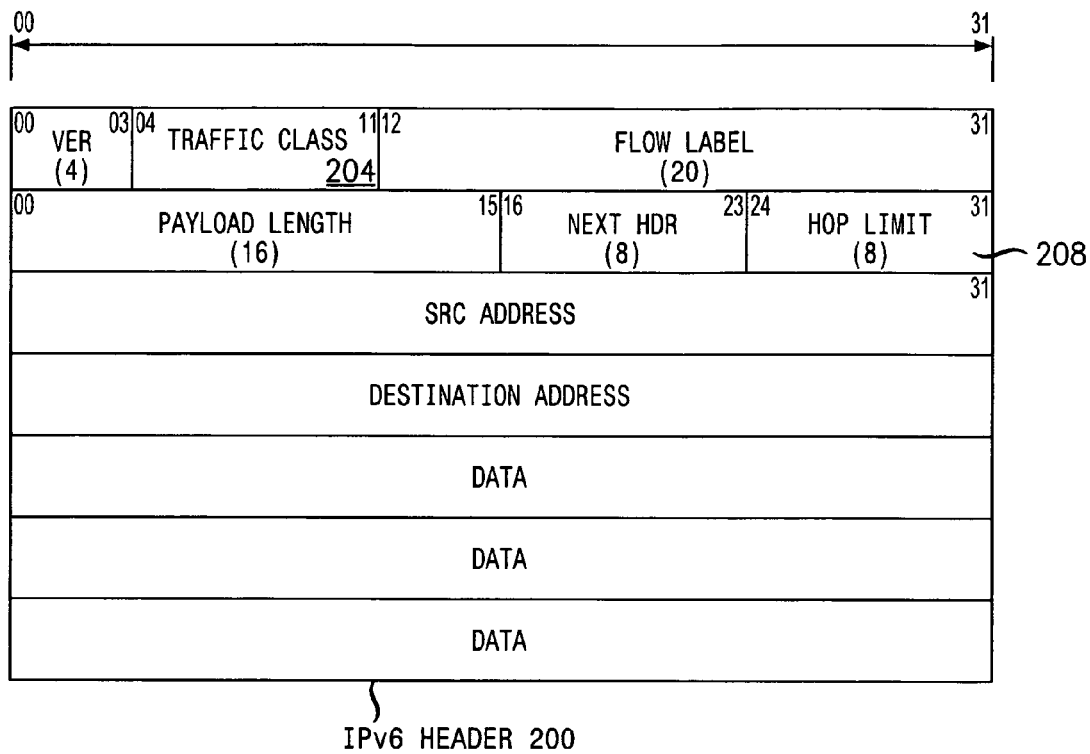
FIG. 2 is a block diagram of a prior art IPv6 packet header.
Figure 3A:
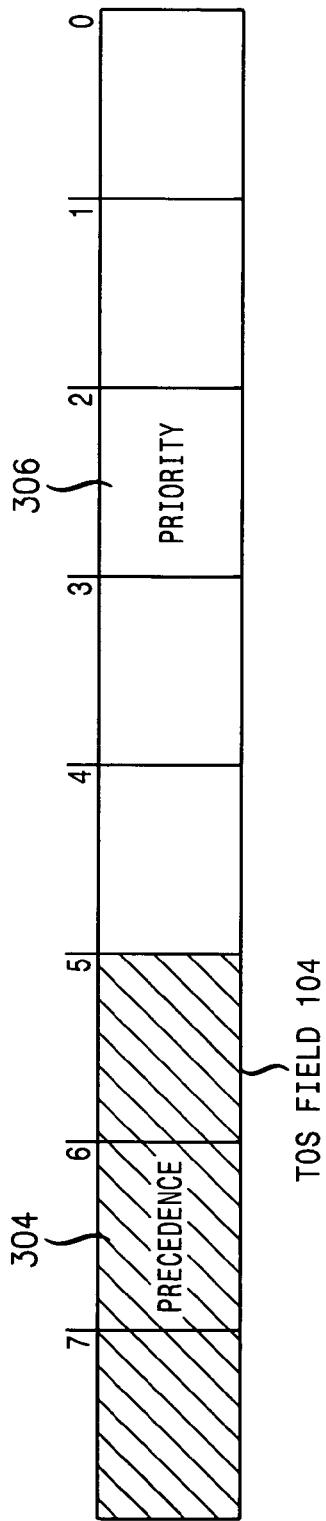
FIG. 3(a) is a block diagram of a prior art Type of Service (TOS) field of an IPv4 header of a packet.
Figure 3B:
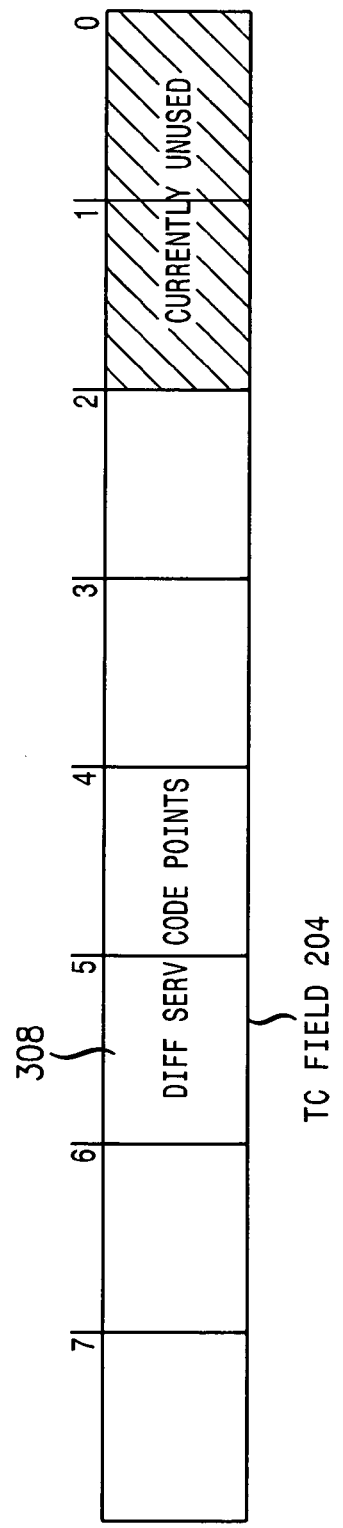
FIG. 3(b) is a block diagram of a prior art Traffic Class (TC) field of an IPv6 header of a packet.
Figure 4:
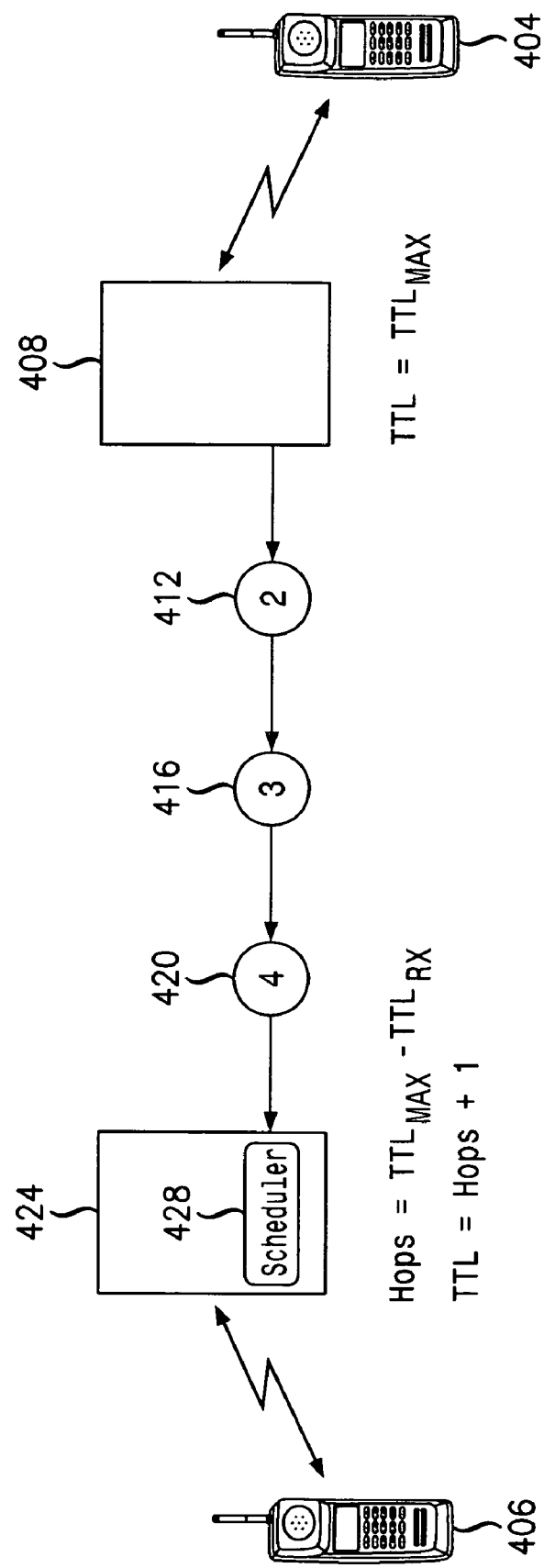
FIG. 4 is a block diagram of a transmitting router communicating a packet to a destination router in accordance with an embodiment of the present invention.

In accordance with an embodiment of the present invention, FIG. 4 shows a block diagram of communications sent from a sending node 404 to a receiving node 406. In one embodiment, the sending node 404 and/or the receiving node 406 are wireless telephones. The sending node 404 transmits packets to a transmitting router 408 (e.g., a base station router (BSR)). The transmitting router 408 can set the TOS or TC field of a packet to be Diff Serv compliant.

The transmitting router 408 then sets the TTL value to a predetermined maximum (i.e., $TTL_{MAX}$). This predetermined maximum can be a parameter negotiated between the transmitting router 408 and a destination router 424 (e.g., a BSR) ($TTL_{NEG}$) (e.g., in a Session Initiation Protocol (SIP)/Session Description Protocol (SDP) session negotiation). Alternatively, the predetermined maximum can be a default maximum.

The packet is then transmitted to a second hop 412, a third hop 416, and a fourth hop 420. Each of these hops 412, 416, 420 can be, for example, routers or switches. Each router 412, 416, 420 subtracts one from the TTL field of the packet's header. The packet is then sent to the destination router 424. The destination router 424 extracts the received TTL (i.e., $TTL_{RX}$). In one embodiment, the destination router 424 then determines the hop count. The hop count is determined from the formula:

$$Hops = TTL_{MAX} - TTL_{RX}$$

or the formula:

$$Hops = TTL_{NEG} - TTL_{RX}$$

The destination router 424 includes a scheduler 428. The scheduler 428 guarantees that a packet arrives at the receiving node 406 before its hop count is exhausted. The scheduler 428 uses the hop count to determine how much flexibility it has in scheduling the packet. Every packet time (i.e., a predetermined time interval associated with a packet), the scheduler 428 subtracts 1 from the hop count.

The destination router 424 then sets the TTL value for subsequent real-time (RT) packets to TTL=Hops+1. The destination router 424 then performs a continuous check on $TTL_{RX}$. If $TTL_{RX} \neq 0$, then the destination router 424 reevaluates the hop count and recalculates the number of hops, if necessary. If $TTL_{RX}=0$, the destination router 424 continues to use TTL=Hops+1.

Although described above as using the TTL field, the invention also applies to IPv6 packets and, in particular, to using the Hop Limit field. As described in more detail below, an embodiment of the present invention uses the TOS or TC fields in conjunction with the TTL or Hop Limit fields.

Figure 5:
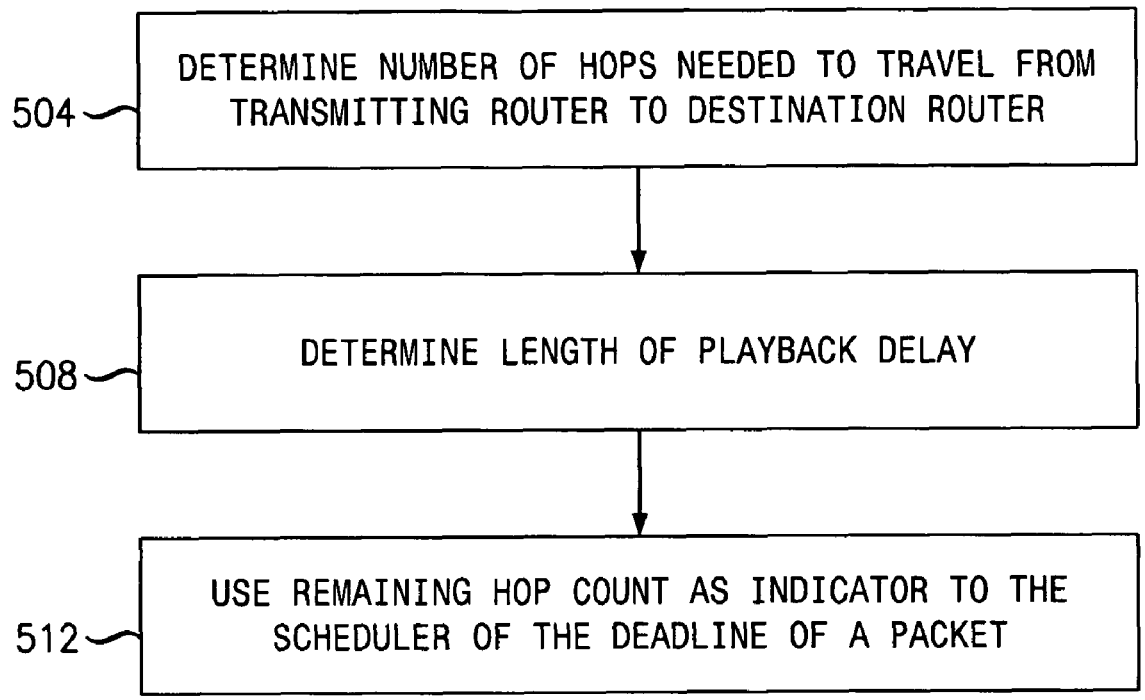
FIG. 5 is a flowchart of the steps performed to schedule the deadline of a packet in accordance with an embodiment of the present invention.

FIG. 5 shows a flowchart illustrating the steps performed in accordance with an embodiment of the invention to determine the deadline of a voice stream packet. Deep packet inspection is not needed to determine the deadline of a packet because of the use of the modified TTL (or Hop Limit) field.

First, the number of hops required for the voice packets to travel from the transmitting router 408 to the destination router 424 over an IP network is determined in step 504. In one embodiment, the transmitting router 408 pings the destination router 424 to determine the number of hops. The reason for determining the number of hops is because the destination router 424 then uses the IP router hop count between the transmitting router 408 and the destination router 424 to determine the deadline of the packet.

Next, the time period needed to process the packet (e.g., output on a wireless telephone) is determined by the destination router 424. A typical VoIP application buffers incoming packets in a playout buffer and delays their playout in order to compensate for variable network delays (i.e., jitter). This allows the slowest packets to arrive in time to be played out. The length of a playback delay (i.e., the length of the playout buffer) imposed by the destination router 424 is determined in step 508.

The reason for determining the playout buffer length in the destination router 424 is to enable the determination of how many extra "virtual" hops need to be added to the hop count to indicate the deadline of the packet. Determining a "virtual" hop is adding an amount to the TTL field for the playout buffer that is equivalent to the amount added to the TTL field for a hop.

For example, if the hop count between the transmitting router and the destination router is N hops, and the playout buffer in the destination router is X packets, then the hop count needs to be set to N+X. Thus, X represents the relative importance of the packet compared with other packets.

The hop count remaining when the packet is received by the destination router is then used as an indicator to the scheduler of the deadline of a packet in step 512. When the voice packet travels over the IP network from the transmitting router to the destination router, every IP router subtracts one from the hop count set by the transmitting router.

The destination router receives a hop count of X. As described above, the destination router then uses this remaining hop count X as an indicator to the wireless channel scheduler of how much flexibility the scheduler has in scheduling the packet. Every packet time, the wireless channel scheduler subtracts 1 from X. If X is large, the wireless channel scheduler can use more aggressive scheduling mechanisms for delivering the packet at the terminal compared to small values of X. X represents the relative importance of the packet because, as X increases, the scheduler has more time before the packet has to be used. Similarly, as X decreases, the scheduler has less time before the packet has to be used. As a result, X represents the importance of the packet (i.e., the more important a packet is, the lower X is).

For a packet transmitted by the receiving node 406 to the sending node 404, the same process applies. Thus, when the destination router 424 receives a packet from the receiving node 406 for transmission to the sending node 404, the destination router 424 already "knows" what to set the packet's hop count to based on the packet(s) that the destination router 424 previously received from the transmitting router 408. Once this hop count is set, the transmitting router 408 receives the packet and can determine, in step 512, that the packet has, for example, a high priority and needs to be delivered to the sending node 404 quickly.

Figure 6:
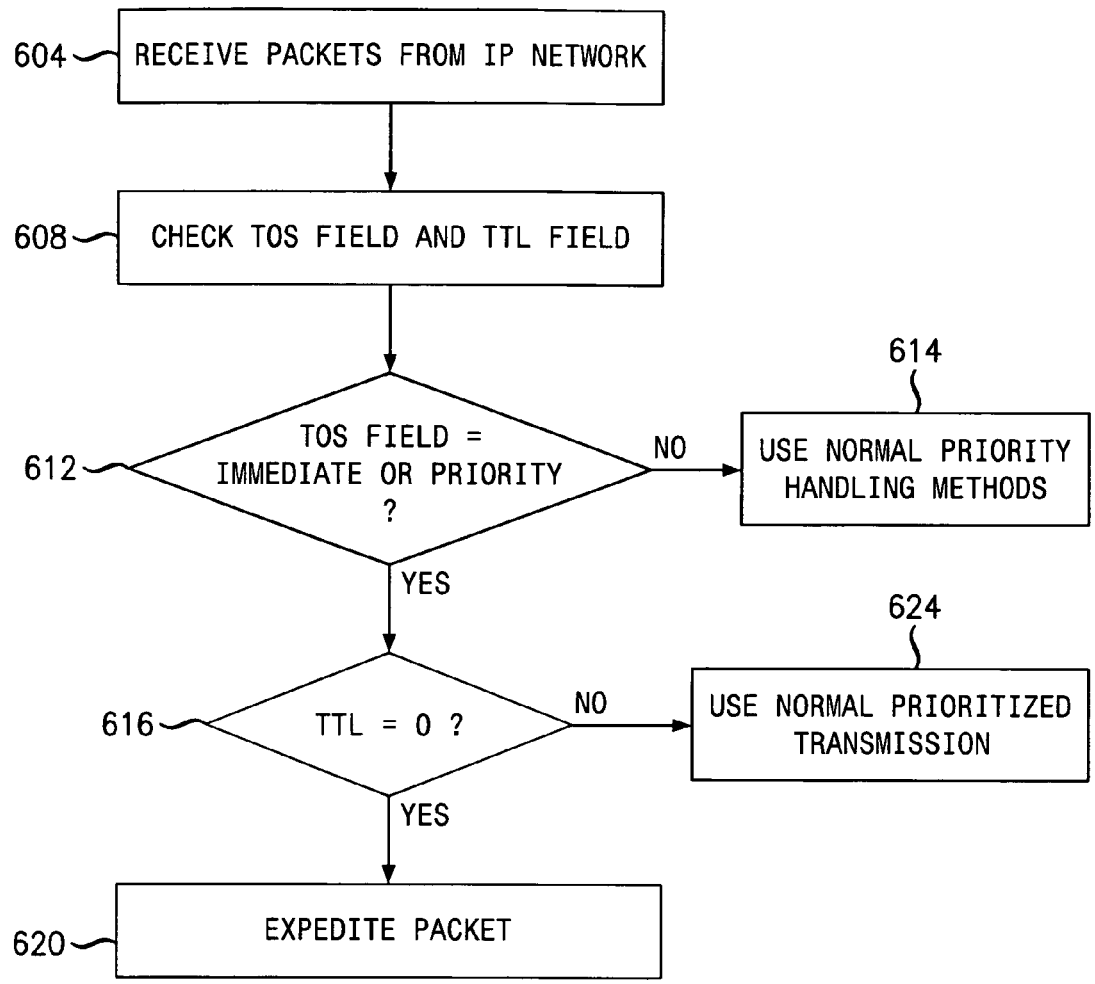
FIG. 6 is a flowchart of the steps performed by the destination router to determine the priority of a packet received from the transmitting router in accordance with an embodiment of the present invention.

FIG. 6 shows a flowchart of the steps performed by the destination router 424 upon receipt of a packet. The destination router 424 receives inbound packets from the IP network in step 604 and checks the TOS (or TC) field and the TTL (or Hop Limit) field in step 608. The destination router 524 then determines whether the TOS (or TC) field equals "immediate" or "priority" in step 612. If the TOS field does not equal "immediate" or "priority" in step 612, then the destination router 424 (i.e., the scheduler 428) uses "normal" priority handling methods in step 614. Normal priority handling methods include having the packet traverse along a destination router's queue in the order of which the packet went onto the queue (e.g., when the TTL field is high enough such that the TTL field does not decrease down to zero before being sent out of the destination router 424).

If the TOS field="immediate" or "priority" in step 612, then the destination router 424 determines whether TTL=0 in step 616. If so, then the destination router 424 (i.e., the scheduler 428) prioritizes the packet for transmission (i.e., expedites the packet) in step 620. The destination router 424 expedites the packet by moving the packet up in the destination router's queue in order to "play" the packet as soon as possible. If not, then the destination router 424 uses normal prioritized transmission for the packet in step 624. The destination router 424 may also receive packets from the receiving node 406. When this occurs, the destination router 424 decrements the TTL field by one (i.e., normal TTL handling behavior).

Figure 7:
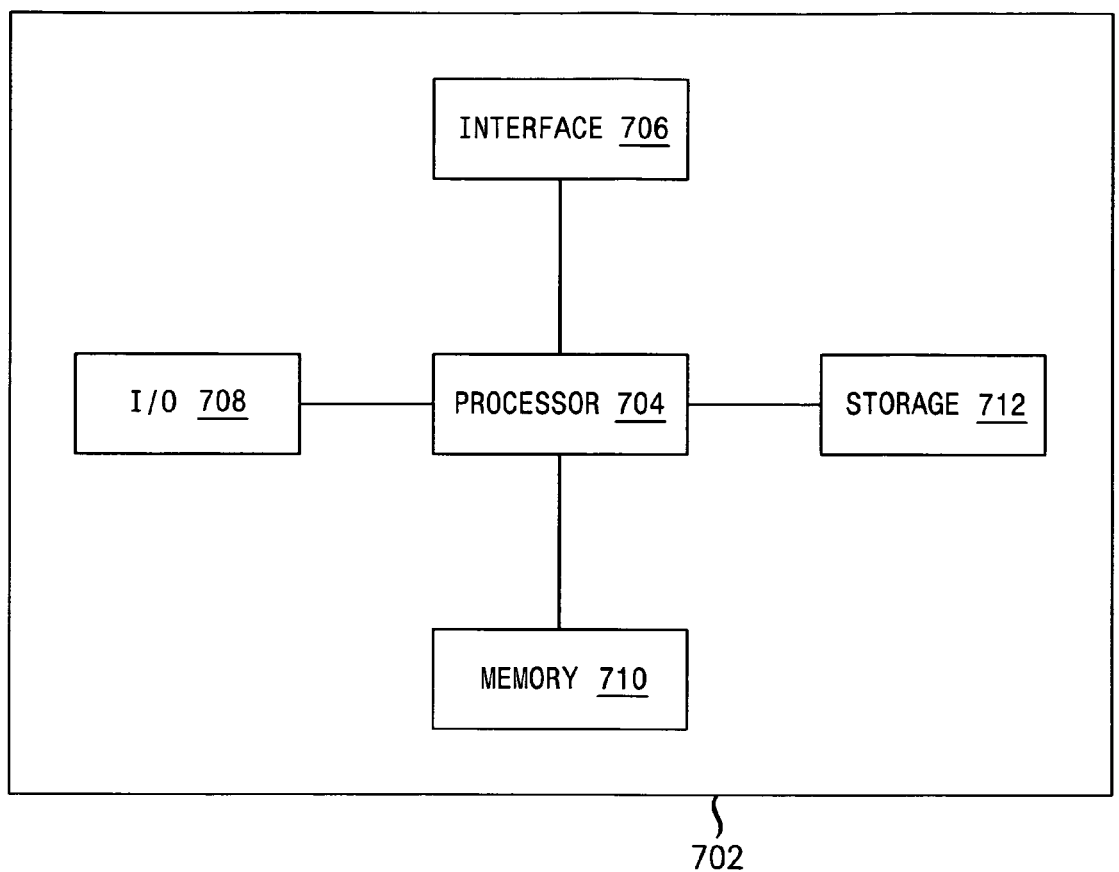
FIG. 7 is a high level block diagram of a computer in accordance with an embodiment of the invention.

The prior description describes embodiments of the present invention in terms of the processing steps required to implement an embodiment of the invention. These steps may be performed by an appropriately programmed computer, the configuration of which is well known in the art. An appropriate computer may be implemented, for example, using well known computer processors, memory units, storage devices, computer software, and other components. A high level block diagram of such a computer is shown in FIG. 7. Computer 702 contains a processor 704 which controls the overall operation of computer 702 by executing computer program instructions which define such operation. The computer program instructions may be stored in a storage device 712 (e.g., magnetic disk) and loaded into memory 710 when execution of the computer program instructions is desired. Computer 702 also includes one or more interfaces 706 for communicating with other devices (e.g., locally or via a network). Computer 702 also includes input/output 708 which represents devices which allow for user interaction with the computer 702 (e.g., display, keyboard, mouse, speakers, buttons, etc.). One skilled in the art will recognize that an implementation of an actual computer will contain other components as well, and that FIG. 7 is a high level representation of some of the components of such a computer for illustrative purposes. For example, computer 702 may represent the transmitting router and/or the receiving router of FIG. 4. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Also, the processing steps may take place in a computer or may be part of a larger machine.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for transmitting a data packet from a source to a destination via a network path including a number of hops, the method comprising:
    storing, in a header of said data packet, a sum of a number of packets in a playout buffer in the destination and said number of hops; and
    transmitting said data packet from said source to said destination via said network path.

2. The method of claim 1 further comprising calculating said sum at least one of said source and said destination.

3. The method of claim 1 further comprising determining said number of packets in a playout buffer in the destination.

4. The method of claim 1 further comprising processing said data packet before said sum of said number of packets in a playout buffer in the destination and said number of hops expires.

5. The method of claim 1 further comprising determining said number of hops.

6. The method of claim 1 further comprising determining priority of said data packet from said number of packets in a playout buffer in the destination and said number of hops.

7. The method of claim 1 wherein said storing further comprises storing said sum in at least one of a Time-to-Live (TTL) field and a hop count field of said header of said data packet.

8. The method of claim 1 further comprising using said sum to determine an order of scheduling.

9. A system for transmitting a data packet from a source to a destination via a network path including a number of hops, the system comprising:
    a source configured to store, in a header of said data packet, a sum of a number of packets in a playout buffer in the destination and said number of hops and configured to transmit said data packet to said destination via said network path.

10. The system of claim 9 further comprising a processor configured to determine said number of packets in a playout buffer in the destination.

11. The system of claim 9 wherein said destination processes said data packet before said sum of said number of packets in a playout buffer in the destination and said number of hops expires.

12. The system of claim 9 wherein said destination determines priority of said data packet from said number of packets in a playout buffer in the destination and said number of hops.

13. A system for transmitting a data packet from a source to a destination via a network path including a number of hops, the system comprising:

means for storing, in a header of said data packet, a sum of a number of packets in a playout buffer in the destination and said number of hops; and means for transmitting said data packet from said source to said destination via said network path.

14. The system of claim 13 further comprising means for calculating said sum.

15. The system of claim 13 further comprising means for determining said number of packets in a playout buffer in the destination.

16. The system of claim 13 further comprising means for processing said data packet before said sum of said number of packets in a playout buffer in the destination and said number of hops expires.

17. The system of claim 13 further comprising means for determining said number of hops.

18. The system of claim 13 further comprising means for determining priority of said data packet from said number of packets in a playout buffer in the destination and said number of hops.

19. The system of claim 13 wherein said means for storing further comprises means for storing said sum in a Time-to-Live (TTL) field of said header of said data packet.

20. The system of claim 13 further comprising means for using said sum to determine an order of scheduling.

* * * * *